(12) United States Patent
Inazu (10) Patent No.: US 10,965,644 B2
(45) Date of Patent: Mar. 30, 2021

(54) NETWORK SWITCH

(71) Applicant: DENSO CORPORATION, Kariya (JP)

(72) Inventor: Kenji Inazu, Kariya (JP)

(73) Assignee: DENSO CORPORATION, Kariya (JP)

( * ) Notice: Subject to any disclaimer, the term of this patent is extended or adjusted under 35 U.S.C. 154(b) by 15 days.

(21) Appl. No.: 16/573,859

(22) Filed: Sep. 17, 2019

(65) Prior Publication Data
US 2020/0014658 A1 Jan. 9, 2020

Related U.S. Application Data

(63) Continuation of application No. PCT/JP2018/012268, filed on Mar. 27, 2018.

(30) Foreign Application Priority Data

Jun. 23, 2017 (JP) .............................. JP2017-123482

(51) Int. Cl.
| | |
|---|---|
| *H04L 29/12* | (2006.01) |
| *H04L 12/46* | (2006.01) |
| *H04L 12/933* | (2013.01) |
| *H04L 12/935* | (2013.01) |

(52) U.S. Cl.
CPC ...... *H04L 61/6022* (2013.01); *H04L 12/4641* (2013.01); *H04L 49/15* (2013.01); *H04L 49/30* (2013.01)

(58) Field of Classification Search
None
See application file for complete search history.

(56) References Cited

U.S. PATENT DOCUMENTS

| | | | |
|---|---|---|---|
| 6,801,525 B1 | 10/2004 | Bodnar et al. | |
| 6,839,346 B1 | 1/2005 | Kametani | |
| 2001/0030322 A1 | 10/2001 | Yamazaki et al. | |
| 2006/0081846 A1 | 4/2006 | Yamazaki et al. | |
| 2009/0267073 A1 | 10/2009 | Yamazaki et al. | |

(Continued)

FOREIGN PATENT DOCUMENTS

| | | |
|---|---|---|
| JP | 2000295274 A | 10/2000 |
| JP | 2003304293 A | 10/2003 |

(Continued)

*Primary Examiner* — Khaled M Kassim
(74) *Attorney, Agent, or Firm* — Harness, Dickey & Pierce, P.L.C.

(57) ABSTRACT

A network switch provides an in-vehicle network, and includes a switch IC having multiple ports and a microcomputer. The switch IC includes: L2 and L3 receivers; first and second memories for storing MAC address and routing tables, respectively; and L2 and L3 processors. The L2 receiver determines whether a destination MAC address in a frame is a network switch address. The L2 processor determines a port corresponding to the destination MAC address based on the MAC address table when the destination MAC address is not the network switch address. The L3 receiver determines whether a transmission source IP address is registered in the routing table when the destination MAC address is the network switch address. The L3 processor determines an output port and another destination MAC address of a forwarding destination based on the routing table and a destination IP address when the transmission source IP address is registered.

7 Claims, 11 Drawing Sheets

(56) References Cited

U.S. PATENT DOCUMENTS

| | | | |
|---|---|---|---|
| 2010/0260146 A1* | 10/2010 | Lu | H04L 12/4633 |
| | | | 370/331 |
| 2011/0149964 A1 | 6/2011 | Judge et al. | |
| 2011/0169011 A1 | 7/2011 | Yamazaki et al. | |
| 2013/0010796 A1 | 1/2013 | Judge et al. | |
| 2013/0207116 A1 | 8/2013 | Yamazaki et al. | |
| 2014/0225196 A1 | 8/2014 | Yamazaki et al. | |
| 2015/0172178 A1 | 6/2015 | Judge et al. | |
| 2015/0249666 A1* | 9/2015 | Kato | H04L 63/1458 |
| | | | 726/7 |
| 2016/0254985 A1 | 9/2016 | Judge et al. | |
| 2016/0306240 A1 | 10/2016 | Yamazaki et al. | |
| 2017/0214599 A1* | 7/2017 | Seo | H04L 41/0816 |
| 2017/0250904 A1* | 8/2017 | Singarayan | H04L 45/66 |
| 2017/0250945 A1* | 8/2017 | Wadhwa | H04L 12/4633 |
| 2017/0310586 A1* | 10/2017 | Lin | H04L 12/6418 |
| 2018/0234339 A1* | 8/2018 | Uchizumi | H04L 61/103 |
| 2019/0215376 A1* | 7/2019 | Kang | H04W 28/04 |
| 2020/0053003 A1* | 2/2020 | Shikata | H04L 45/66 |
| 2020/0099615 A1* | 3/2020 | Mittal | H04L 45/74 |
| 2020/0145437 A1* | 5/2020 | Torisaki | H04L 63/1416 |

FOREIGN PATENT DOCUMENTS

| | | |
|---|---|---|
| JP | 3875521 B2 | 1/2007 |
| JP | 2010183421 A | 8/2010 |
| JP | 5964239 B2 | 8/2016 |
| JP | 2017123482 A | 7/2017 |

\* cited by examiner

NETWORK SWITCH

CROSS REFERENCE TO RELATED APPLICATIONS

The present application is a continuation application of International Patent Application No. PCT/JP2018/012268 filed on Mar. 27, 2018, which designated the U.S. and claims the benefit of priority from Japanese Patent Application No. 2017-123482 filed on Jun. 23, 2017. The entire disclosures of all of the above applications are incorporated herein by reference.

TECHNICAL FIELD

The present disclosure relates to a network switch that connects different VLANs and configures an in-vehicle network.

BACKGROUND

In-vehicle networks require real-time capability. For this reason, Ethernet (registered trademark) capable of higher speed communication than CAN (registered trademark) or LIN is considered as a communication standard. In the case of Ethernet, a network switch is provided between nodes, and Ethernet frames are transferred through the network switch.

Such a network switch includes a switch IC and a microcomputer (hereinafter referred to as a microcomputer). Further, the microcomputer executes IP routing operation by software control.

SUMMARY

According to an example embodiment, a network switch provides an in-vehicle network, and includes a switch IC having multiple ports and a microcomputer. The switch IC includes: L2 and L3 receivers; first and second memories for storing MAC address and routing tables, respectively; and L2 and L3 processors. The L2 receiver determines whether a destination MAC address in a frame is a network switch address. The L2 processor determines a port corresponding to the destination MAC address based on the MAC address table when the destination MAC address is not the network switch address. The L3 receiver determines whether a transmission source IP address is registered in the routing table when the destination MAC address is the network switch address. The L3 processor determines an output port and another destination MAC address of a forwarding destination based on the routing table and a destination IP address when the transmission source IP address is registered.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Even in the case of transferring a frame between different VLANs, communication is performed via the network switch. In a considerable network switch, the frame received by the switch IC is transferred to the microcomputer, and the microcomputer executes an IP routing operation by software control, which may cause a difficulty of delay.

In order to reduce the delay, for example, it is conceivable to increase the processing capacity of the microcomputer and to increase the communication speed between the switch IC and the microcomputer. However, since both a high-performance microcomputer and a high-speed communication I/F require a high-speed clock, a difficulty may arise that heat generation becomes large.

According to an example embodiment, a network switch is provided such that reduces delay and suppresses heat generation in a case where a network switch configures an in-vehicle network.

According to an example embodiment, a network switch includes a switch IC having a plurality of ports and a microcomputer. The network switch connects different VLANs to a plurality of ports to provide an in-vehicle network. The switch IC includes: a L2 receiver that extracts a MAC address from the frame received through the port, and determines whether a destination MAC address in the MAC address corresponds to an address of the network switch; a first memory that stores a MAC address table; a L2 processor that determines the port corresponding to the destination MAC address based on the MAC address table when it is determined that the destination MAC address does not correspond to the address of the network switch, and transmits the frame through a determined port; a second memory that stores a routing table; a L3 receiver that extracts an IP address of the frame when it is determined that the destination MAC address corresponds to the address of the network switch, and determines whether a transmission source IP address in the IP address corresponds to a registered address registered in the routing table; and a L3 processor that determines an output port and a destination MAC address of a forwarding destination based on the routing table and a destination IP address in the IP address when the transmission source IP address corresponds to the registered address, and transmits the frame though the port which is determined by replacing the MAC address in the frame with the destination MAC address of the forwarding destination. The microcomputer includes: a rewrite unit that rewrites a registered content of the MAC address table and a registered content of the routing table; and a determination unit that determines whether a node of the transmission source is a proper device allowed communication when it is determined that the transmission source IP address does not corresponds to the registered address.

According to this network switch, the IC switch has the L3 receiver and the L3 processor described above. As described above, since the IC switch has a main function of a IP routing operation, the delay is reduced as compared with a configuration in which the IP routing operation is performed by software control. Further, since it is not necessary to use a high-performance microcomputer or a high-speed communication I/F, heat generation is suppressed. As described above, heat generation is suppressed while reducing delay.

Multiple embodiments will be described with reference to the drawings. In the plurality of embodiments, portions functionally and/or structurally corresponding to each other will be provided with the same reference signs.

First Embodiment

First, a network switch according to the present embodiment will be described based on FIG. 1.

Figure 1:
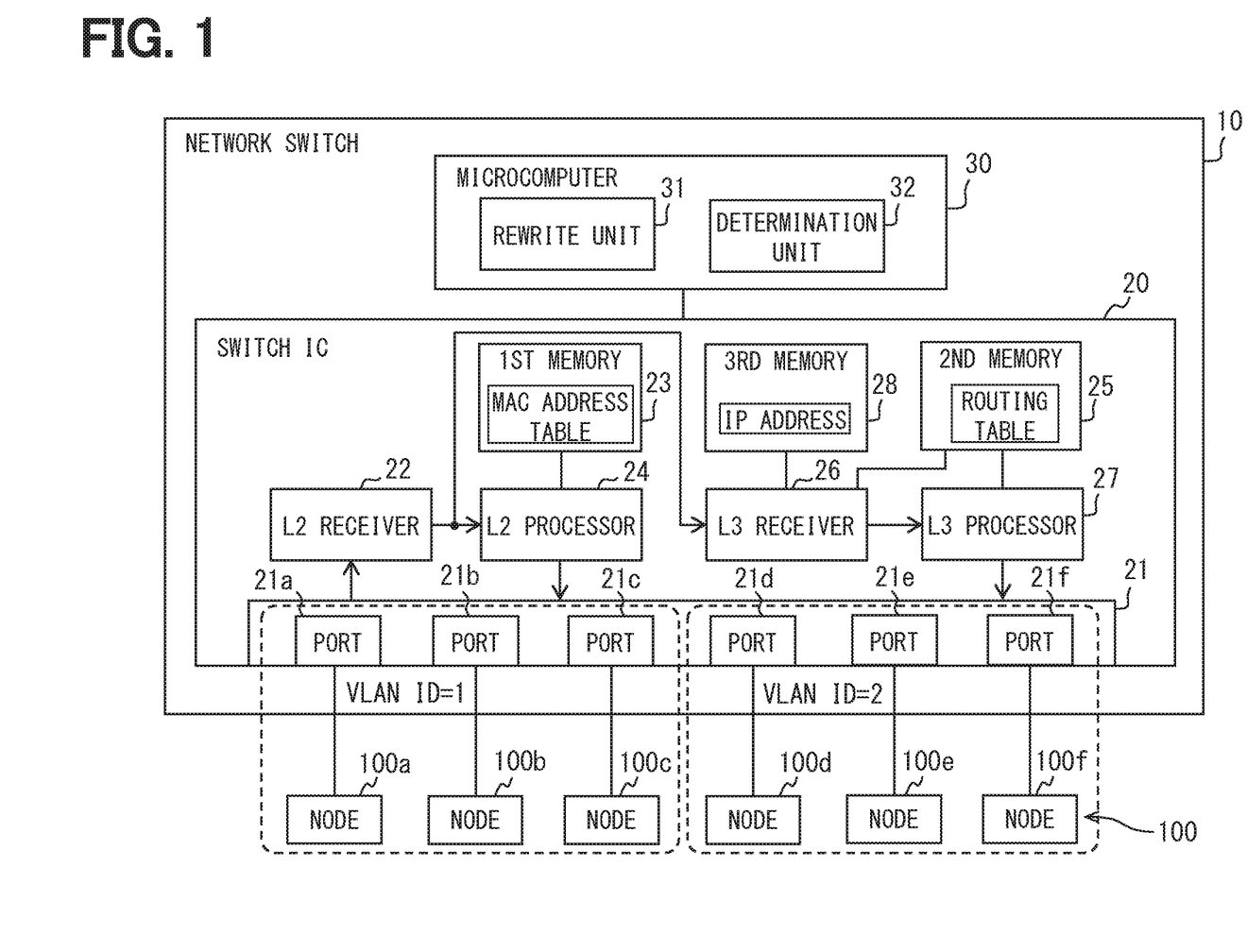
FIG. 1 is a diagram showing an in-vehicle network to which a network switch according to a first embodiment is applied.

The network switch 10 shown in FIG. 1 is mounted on a vehicle. The network switch 10 connects different VLANs (Virtual LANs) to form a part of an in-vehicle network. A network via the network switch 10 is a network that uses Ethernet (registered trademark) as a communication standard.

The in-vehicle network is a network established by a plurality of communication standards including Ethernet. Among them, Ethernet is a communication standard having a higher communication speed than CAN (registered trademark) or LIN. The Ethernet is a communication standard with a communication speed of 10 Mbps or more. In the Ethernet, a PtoP (one-to-one) connection form is established. Hereinafter, a network via the network switch 10 is referred to as an in-vehicle network.

The network switch 10 includes a switch IC 20 and a microcomputer 30. The microcomputer 30 is hereinafter simply referred to as the microcomputer 30. The network switch 10 further includes a physical layer IC (i.e., PHY chip) not shown, in which a waveform generating circuit and the like are arranged.

The switch IC 20 includes an L2 circuit that relays based on a MAC address in an Ethernet frame, and an L3 circuit that relays based on an IP address. The switch IC 20 is an Ethernet switch provided with a part of the IP routing function. The switch IC 20 is configured using an application specific integrated circuit (i.e., ASIC), a field programmable gate array (i.e., FPGA), or the like. The switch IC 20 is configured to have a logic circuit and a memory. The Ethernet frame corresponds to a frame.

The switch IC 20 includes a plurality of ports 21, an L2 receiver 22, a first memory 23, an L2 processor 24, a second memory 25, an L3 receiver 26, an L3 processor 27, and a third memory 28. The L2 receiver 22, the first memory 23, and the L2 processor 24 correspond to an L2 circuit. The second memory 25, the L3 receiver 26, the L3 processor 27, and the third memory 28 correspond to an L3 circuit.

The node 100 is connected to the port 21 via the physical layer IC. In the present embodiment, the switch IC 20 has six ports 21a to 21f as the port 21. The nodes 100a to 100f are connected to the ports 21a to 21f, respectively. For example, the node 100a is connected to the port 21a, and the node 100d is connected to the port 21d.

Also, the network is divided by the port VLAN. In this embodiment, "VLAN ID=1" is set to the ports 21a to 21c, and "VLAN ID=2" is set to the ports 21d to 21f. Thus, it is divided into two VLANs. For example, one of the VLANs is a control system of the vehicle, and the other is an infotainment system. Thus, the VLANs are classified for each system. The control system is a system relating to the basic performance of a vehicle such as an engine control, a steering control, and a brake control.

The L2 receiver 22 receives an Ethernet frame through the port 21. The L2 receiver 22 checks the received Ethernet frame, and determines whether the Ethernet frame is properly received.

When the L2 receiver 22 successfully receives, the L2 receiver 22 determines whether the destination MAC address is the MAC address of itself (i.e., the network switch 10) among the MAC addresses of the received Ethernet frame.

The first memory 23 stores a MAC address table. In the MAC address table, the port 21 and the MAC address of the node 100 connected to the port 21 are associated with each other. The MAC address table is not rewritten (i.e., updated) autonomously by the switch IC 20, but is rewritten by the microcomputer 30. The first memory 23 is configured of a memory such as a RAM.

When the destination MAC address is not its own MAC address, the L2 processor 24 determines the port 21 corresponding to the destination MAC address based on the MAC address table. The L2 processor 24 determines whether the VLAN of the transmission source and the VLAN of the destination are the same, and transmits the Ethernet frame through the determined port 21 when the VLANs are identical. On the other hand, when the VLAN are different, the Ethernet frame is discarded.

The second memory 25 stores a routing table. The routing table includes a summary of rout information for each VLAN. Specifically, the port 21, the network address, the next hop address, etc. are included in the routing table. In the routing table, the IP address of the next hop (i.e., a forwarding destination) and the MAC address corresponding to this IP address are described as the next hop address. In the case of the in-vehicle network, since the number of nodes is small, the routing table is a table including the MAC address. The routing table is not rewritten (i.e., updated) autonomously by the switch IC 20, but is rewritten by the microcomputer 30. The second memory 25 is configured of a memory such as a RAM.

The L3 receiver 26 executes a predetermined process when the destination MAC address of the Ethernet frame received by the L2 receiver 22 is its own MAC address. The L3 receiver 26 extracts an IP address, which is L3 header information, from the received Ethernet frame, and stores the IP address in the third memory 28. Then, the receiver 26 checks whether the transmission source IP address in the IP address is a registered address. The L3 receiver 26 checks whether the transmission source IP address is the registered address based on the routing table.

When the L3 receiver 26 determines that the transmission source IP address is not already registered, the L3 receiver 26 transmits the IP address stored in the third memory 28 described later to the microcomputer 30.

When it is determined that the transmission source IP address has been already registered, the L3 processor 27 determines the output port 21 and the destination MAC address of the forwarding destination based on the routing table and the destination IP address. Then, the Ethernet frame is restructured and transmitted through the determined port 21.

The destination MAC address corresponding to the destination IP address is the MAC address of the destination node 100 in the VLAN of the output port 21. For example, when the next hop is a direct connection, the destination MAC address is the MAC address of the node 100 in which the destination IP address is set. Also, when the next hop is another network switch, that is, when the destination node 100 is another network switch, the destination MAC address is the MAC address of the other network switch.

The L3 processor 27 restructures the Ethernet frame by replacing the MAC address and modifying the IP header, and transmits the restructured Ethernet frame through the port 21.

The third memory 28 temporarily stores the IP address extracted by the L3 receiver 26. The third memory 28 is configured by a register or the like.

The microcomputer 30 is configured to include a CPU, a ROM, a RAM, and a register. In the microcomputer 30, the CPU executes a predetermined process in accordance with a control program preliminarily stored in the ROM while utilizing a temporary storage function of the register or the RAM. The microcomputer 30 executes a predetermined process under software control. The microcomputer 30 includes a rewrite unit 31 and a determination unit 32 as functional units (i.e., software execution units).

The rewrite unit 31 rewrites the registered content of the MAC address table stored in the first memory 23 of the switch IC 20 and the registered content of the routing table stored in the second memory 25. For example, when it is determined by the determination unit 32 that the new node is a proper device allowed the communication through the Ethernet, the registered content is rewritten to add the new node. The rewrite unit 31 writes the registered content of the MAC address table in the first memory 23 and writes the registered content of the routing table in the second memory 25 as the initial process to be executed at the time of the activation when the power source of the network switch 10 turns on.

When the L3 receiver 26 determines that the transmission source IP address is not a registered address, the determination unit 32 determines whether the node of the transmission source IP address is a proper device permitted to communicate through the Ethernet. The proper device list is stored in advance in the memory. When receiving the IP address from the switch IC 20, the determination unit 32 determines whether the device is proper.

Figure 2:
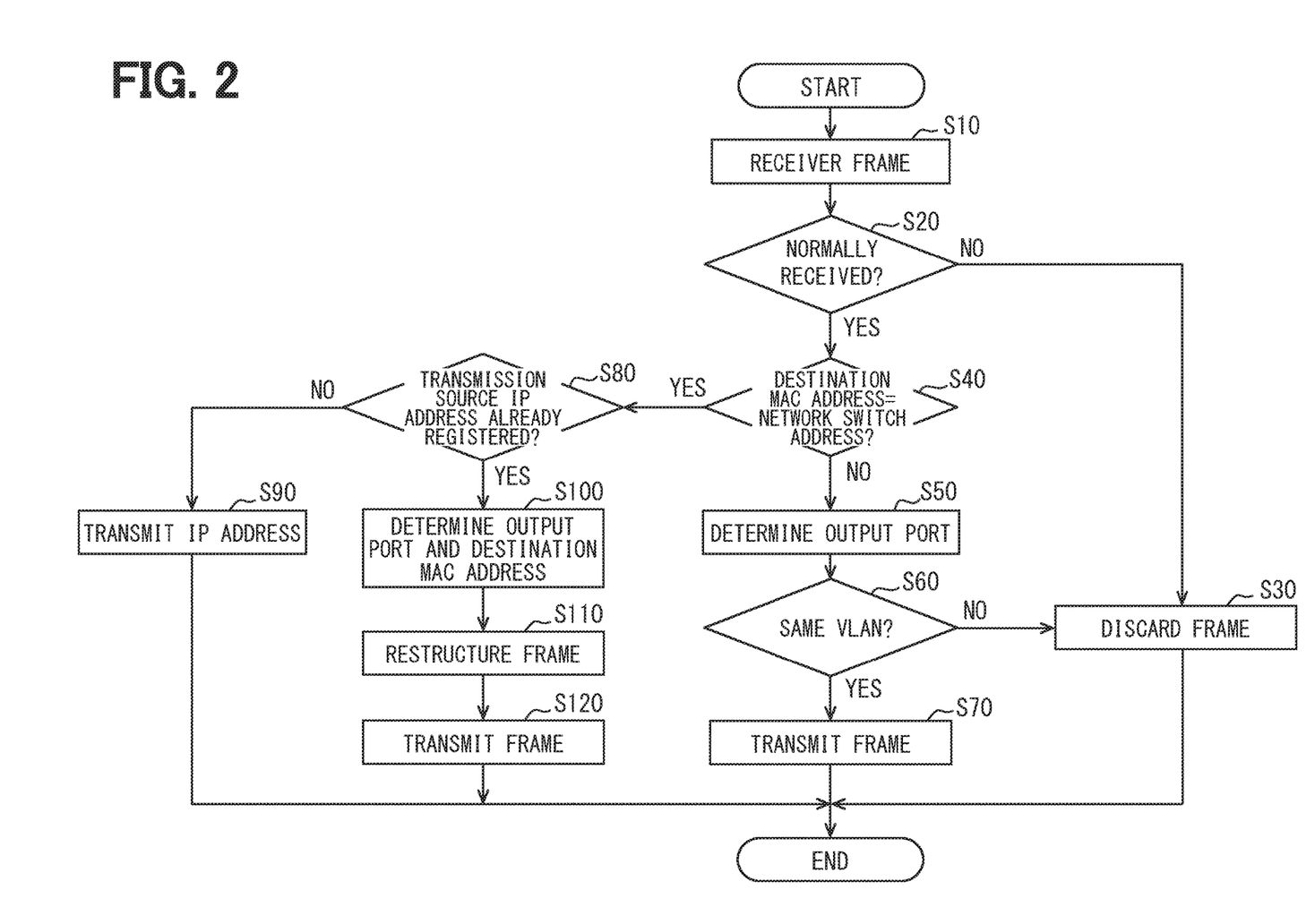
FIG. 2 is a flowchart showing a process performed by a switch IC.
Figure 3:
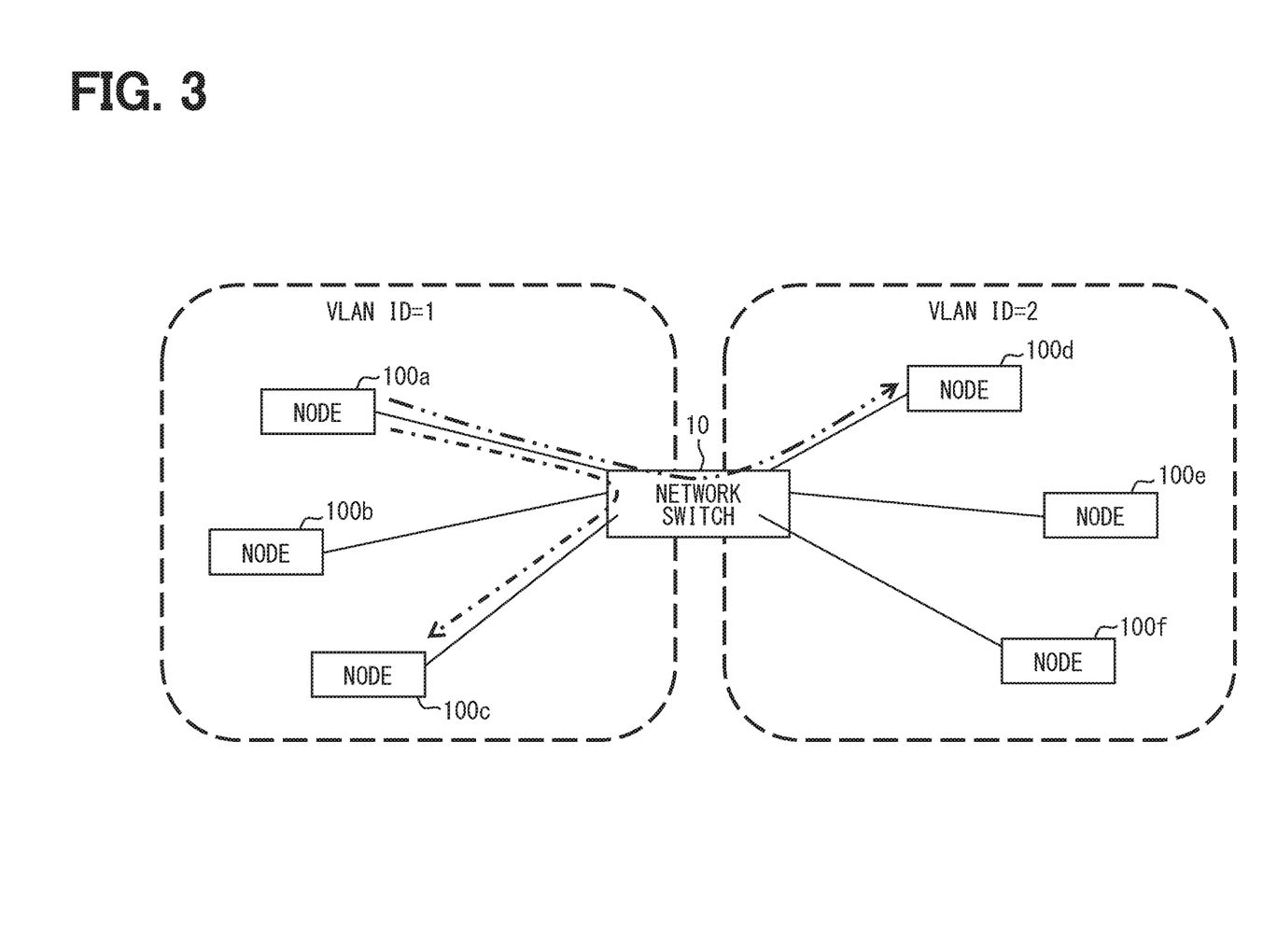
FIG. 3 is a diagram showing a relaying example of an Ethernet frame.

Next, a process (i.e., a relay process) executed by the switch IC 20 will be described with reference to FIGS. 2 and 3. The switch IC 20 repeatedly executes the process described below in a state where the power source is in the on state.

First, the L2 receiver 22 of the switch IC 20 receives an Ethernet frame through the port 21 (at step S10).

Next, the L2 receiver 22 checks the Ethernet frame, and determines whether the frame is received normally (at step S20). The L2 receiver 22 performs an error check of the Ethernet frame based on the value of the CRC field in the Ethernet frame. Also, the MAC address which is L2 header information is extracted from the received Ethernet frame, and it is checked whether the transmission source MAC address in the MAC addresses is a registered address. Based on the MAC address table stored in the first memory 23, the L2 receiver 22 checks whether the transmission source MAC address is a registered address.

When it is determined by the error check described above that the Ethernet frame is anomaly received, the L2 receiver 22 discards the Ethernet frame (at step S30), and ends the series of process.

On the other hand, when it is determined that the Ethernet frame has been received normally, the L2 receiver 22 determines whether the destination MAC address is its own MAC address (at step S40). That is, it is determined whether it is necessary to hand over the process to the L3 circuit.

When it is determined in step S40 that the destination MAC address is not its own MAC address, that is, it is determined that it is not necessary to hand over to the L3 circuit, the L2 processor 24 determines the port 21 corresponding to the destination MAC address based on the MAC address table. That is, the port 21 for outputting the Ethernet frame is determined (at step S50).

Next, the L2 processor 24 determines whether the VLAN of the transmission source and the VLAN of the destination are the same (at step S60). In the present embodiment, the port VLAN is adopted as described above. Therefore, it is determined whether the VLANs are identical, based on the VLAN ID of the port 21 receiving the Ethernet frame, i.e., the port 21 of the transmission source, and the VLAN ID of the port 21 for outputting the Ethernet frame, i.e., the port 21 of the destination.

When it is determined that the VLANs are different, the L2 processor 24 executes the process of step S30, that is, discards the Ethernet frame, and ends the series of process.

On the other hand, when determining that the VLANs are identical, the L2 processor 24 outputs the Ethernet frame to the port 21 determined in step S50, and transmits the Ethernet frame to the node 100 of the destination MAC address through the port 21 (at step S70). For example, as shown by a dashed-dotted line in FIG. 3, when transferring an Ethernet frame from the node 100a to the node 100c, the switch IC 20 executes the process of steps S10, S20, S40, S50, S60, and S70 described above, so that the Ethernet frame is transferred through the network switch 10.

In step S40, when it is determined that the destination MAC address is the MAC address of its own, that is, it is determined that it is necessary to hand over to the L3 circuit, the process on the L3 circuit side is performed. First, the L3 receiver 26 extracts an IP address from the received Ethernet frame, stores the IP address in the third memory 28, and determines whether the transmission source IP address is a registered address (at step S80). The L3 receiver 26 checks whether the transmission source IP address is a registered address based on the routing table stored in the second memory 25.

When it is determined in step S80 that the address is not a registered address, the L3 receiver 26 transmits the IP address stored in the third memory 28 to the microcomputer 30 (at step S90). Then, the series of process is completed. Thus, the determination unit 32 of the microcomputer 30 determines whether the node of the transmission source IP address is a proper device.

When it is determined in step S80 that the address is a registered address, the L3 processor 27 determines a route corresponding to the destination IP address, a port 21 to output to the route, and a destination MAC address which is a MAC address of the forwarding destination (i.e., next hop), based on the routing table stored in the second memory 25 (at step S100).

Next, the L3 processor 27 restructures an Ethernet frame (at step S110). The L3 processor 27 replaces the MAC address. Specifically, the transmission source MAC address is replaced with the destination MAC address determined in step S100. At this time, the MAC address of itself (i.e., the network switch 10) is set as a transmission source MAC address. Also, the IP header is modified. Specifically, the value of TTL (Time To Live) and the value of checksum are changed.

Then, the L3 processor 27 outputs the restructured Ethernet frame to the port 21 determined in step S100, and transmits the Ethernet frame to the node 100 of the destination MAC address through the port 21 (at step S120). For example, as shown by a dashed-two dotted line in FIG. 3, when transferring an Ethernet frame from the node 100a to the node 100d, the switch IC 20 executes the process of steps S10, S20, S40, S80, S100, S110 and S120 described above, so that the Ethernet frame is transferred through the network switch 10.

Next, the effects of the network switch 10 according to the present embodiment will be described.

In the present embodiment, the switch IC 20 includes the second memory 25, the L3 receiver 26, and the L3 processor 27. Thus, the switch IC 20 can determine whether the transmission source IP address in the Ethernet frame is a registered address. Also, after determining that the address has been registered, it is possible to determine the output port 21 and the destination MAC address of the forwarding destination based on the routing table, to restructure the Ethernet frame, and to transmit from the determined port.

Thus, the IC switch 20 has the main function of the IP routing operation. Therefore, the delay can be reduced as compared with the configuration in which the microcomputer 30 executes the IP routing operation under software control. Moreover, since it is not necessary to arrange a high-performance microcomputer or a high-speed communication I/F, heat generation can be suppressed. As described above, heat generation is suppressed while reducing delay. Furthermore, the amount of communication between the switch IC 20 and the microcomputer 30 can be reduced, so that the increase in emission (i.e., emission of electromagnetic noise) is restricted.

Figure 4:
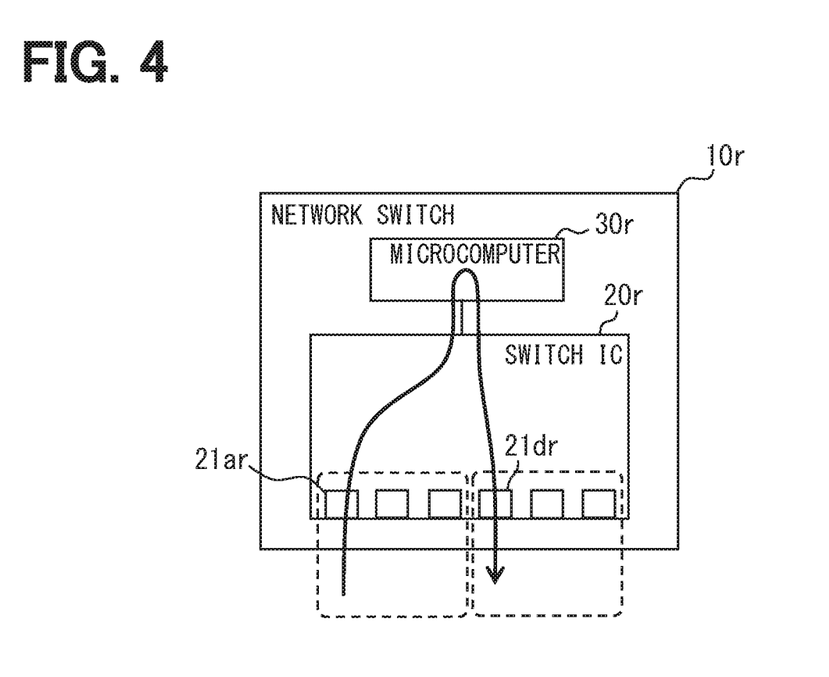
FIG. 4 is a diagram showing a communication path of a IP routing process in a comparative example.
Figure 5:
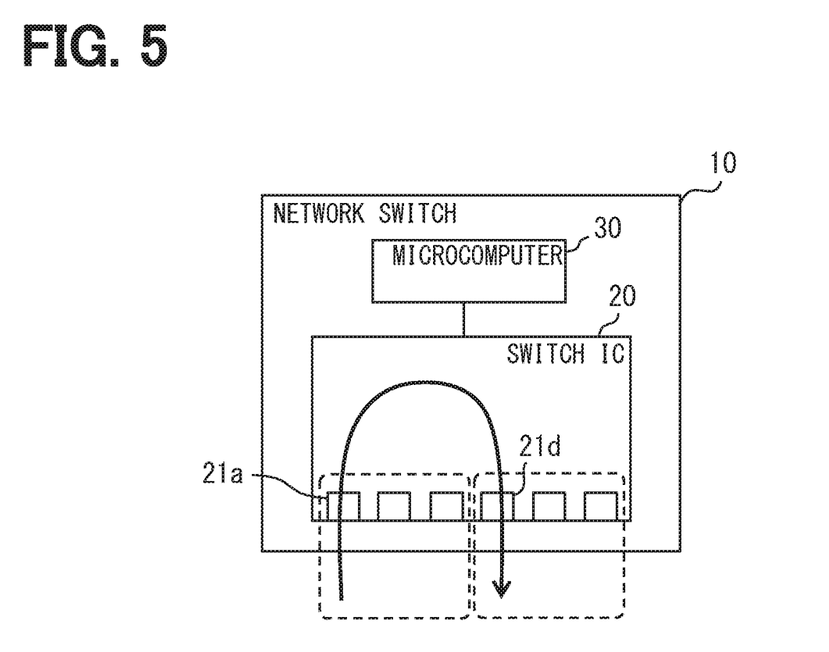
FIG. 5 is a diagram showing a communication path of the IP routing process.
Figure 6:
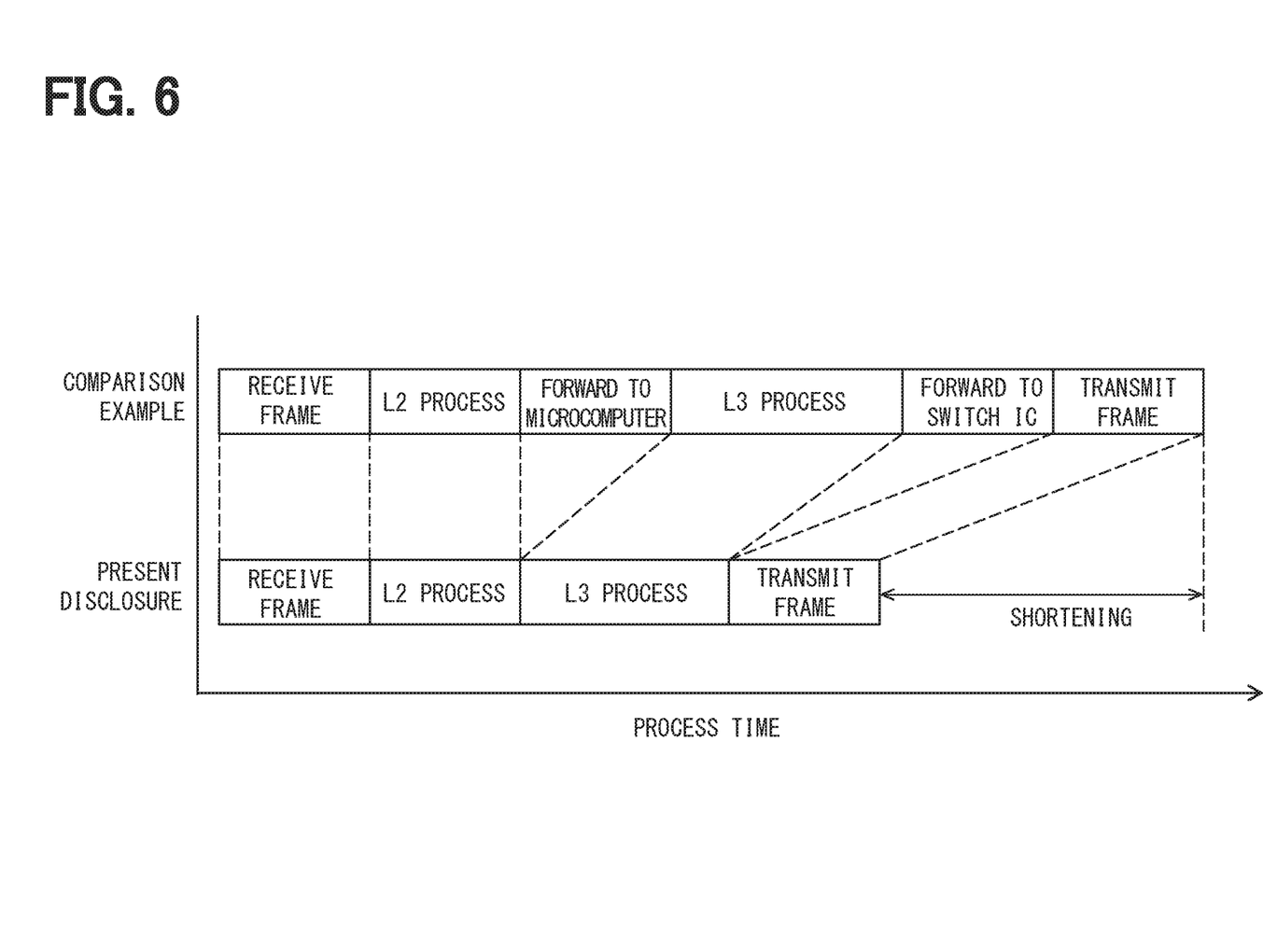
FIG. 6 is a timing chart of the IP routing process.

FIGS. 4 to 6 are diagrams for explaining the above effects. FIG. 4 shows a communication path during the IP routing process in a comparative example. In the comparative example, a code in which a sign of r is added to the end of the code of the element of the present embodiment is put into the element common to or related to the element of the present embodiment.

The network switch 10r of the comparative example shown in FIG. 4 also includes a switch IC 20r and a microcomputer 30r. However, the switch IC 20r has only the L2 circuit and does not have the L3 circuit. The microcomputer 30r executes an IP routing operation by software control. As shown in FIG. 4, when relaying on ports 21ar and 21dr having different VLAN IDs, respectively, the Ethernet frame received through the port 21ar is processed in the L2 process at the switch IC 20r, and then, transferred to the microcomputer 30r. Then, after processing in the L3 process by the microcomputer 30r, the Ethernet frame is transmitted from the microcomputer 30r to the switch IC 20r, and transmitted from the port 21dr.

On the other hand, according to this embodiment, as shown in FIG. 5, the Ethernet frame received through the port 21a is processed in the L2 process and the L3 process at the switch IC 20, and then, transmitted from the port 21d. That is, the Ethernet frame can be relayed without being transferred to the microcomputer 30. For this reason, as shown in FIG. 6, when the IP routing operation is required, the process time required for relaying the Ethernet frames can be shortened compared to the comparative example. The frame reception corresponds to the process in step S10, and the L2 process corresponds to the processes in steps S20 and S40. The L3 process corresponds to the processes of steps S80, S100, and S110, and the frame transmission corresponds to the process of step S120.

The process of step S60 may be omitted, and the L2 processor 24 of the switch IC 20 may be configured to execute the process of step S70 after step S50. On the other hand, in the present embodiment, the L2 processor 24 is configured to execute the process of step S60. Therefore, the L2 processor 24 transmits an Ethernet frame through the port 21 determined based on the MAC address table only when the VLAN of the transmission source and the VLAN of the destination VLAN are the same. When the VLAN of the transmission source and the VLAN of the destination do not match, the Ethernet frame is discarded. In particular, when the VLAN is classified for each system as in the control system and the infotainment system, since it is sufficient to transfer data in VLAN in general, the security can be enhanced.

The switch IC 20 may be configured to transmit an Ethernet frame to the microcomputer 30 when it is determined that the transmission source IP address is not a registered address. On the other hand, in the present embodiment, the IP address extracted by the L3 receiver 26 is temporarily stored in the third memory 28, and the IP address is transmitted to the microcomputer 30 when it is determined that the IP address is not a registered address. Therefore, the delay can be further reduced.

The application of the network switch 10 is not limited to the above example. For example, in the modification shown in FIG. 7, two network switches 10a and 10b are connected. Each of the network switches 10a and 10b has the same configuration as that of the network switch 10. "VLAN ID=1" is set to a part of the plurality of ports 21 of the network switch 10a, and "VLAN ID=2" is set to the remaining ports 21. Further, "VLAN ID=2" is set to a part of the plurality of ports 21 of the network switch 10b, and "VLAN ID=3" is set to the remaining ports 21.

Figure 7:
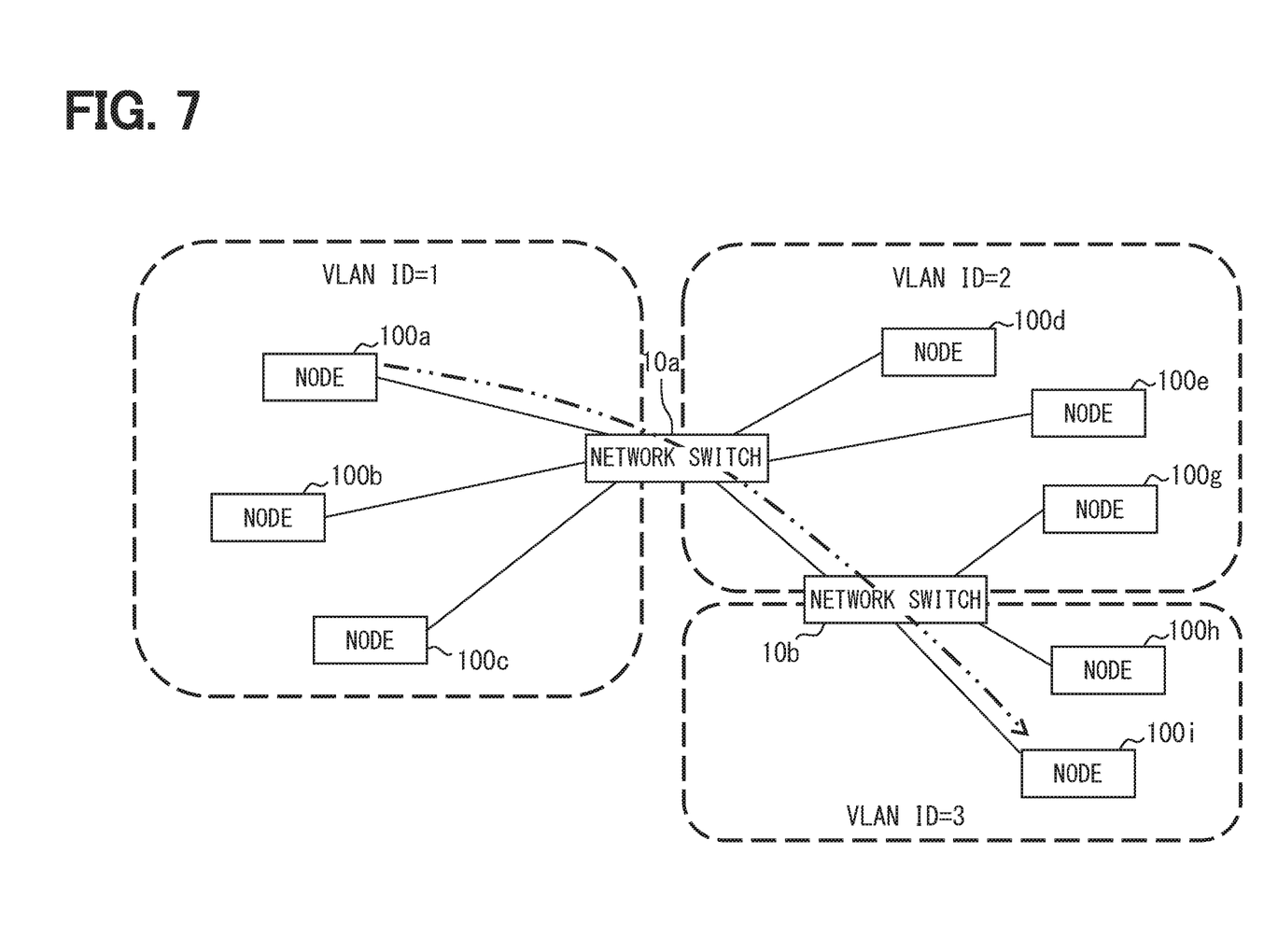
FIG. 7 is a diagram showing a modification of the in-vehicle network.

The nodes 100a, 100b, and 100c are connected to the port 21 with "VLAN ID=1" in the network switch 10a, and the nodes 100d and 100e are connected to the port 21 with "VLAN ID=2" in the network switch 10a. The node 100g is connected to the port 21 of "VLAN ID=2" in the network switch 10b, and the nodes 100h and 100i are connected to the port 21 of "VLAN ID=3" in the network switch 10b.

As shown by a dashed-two dotted line in FIG. 7, when transferring an Ethernet frame from the node 100a to the node 100i, the IP address of the node 100a is set as the transmission source IP address, and the IP address of node 100i is set as the destination IP address. Further, the MAC address of the node 100a is set as the transmission source MAC address, and the MAC address of the network switch 10a is set as the destination MAC address.

The switch IC 20 of the network switch 10a receives the Ethernet frame through the port 21 corresponding to the node 100a, and executes the above-described process. By this process, the transmission source MAC address is replaced with the MAC address of the network switch 10a, and the destination MAC address is replaced with the MAC address of the network switch 10b. Then, an Ethernet frame is transmitted from the port 21 corresponding to the network switch 10b.

The switch IC 20 of the network switch 10b receives the Ethernet frame through the port 21 corresponding to the network switch 10a, and executes the process described above. By this process, the transmission source MAC address is replaced with the MAC address of the network switch 10b, and the destination MAC address is replaced with the MAC address of the node 100i. Then, an Ethernet frame is transmitted from the port 21 corresponding to the node 100i.

Second Embodiment

For the present embodiment, it may refer to the preceding embodiment. Therefore, the description of the parts common to the network switch 10 described in the preceding embodiment is omitted.

Figure 8:
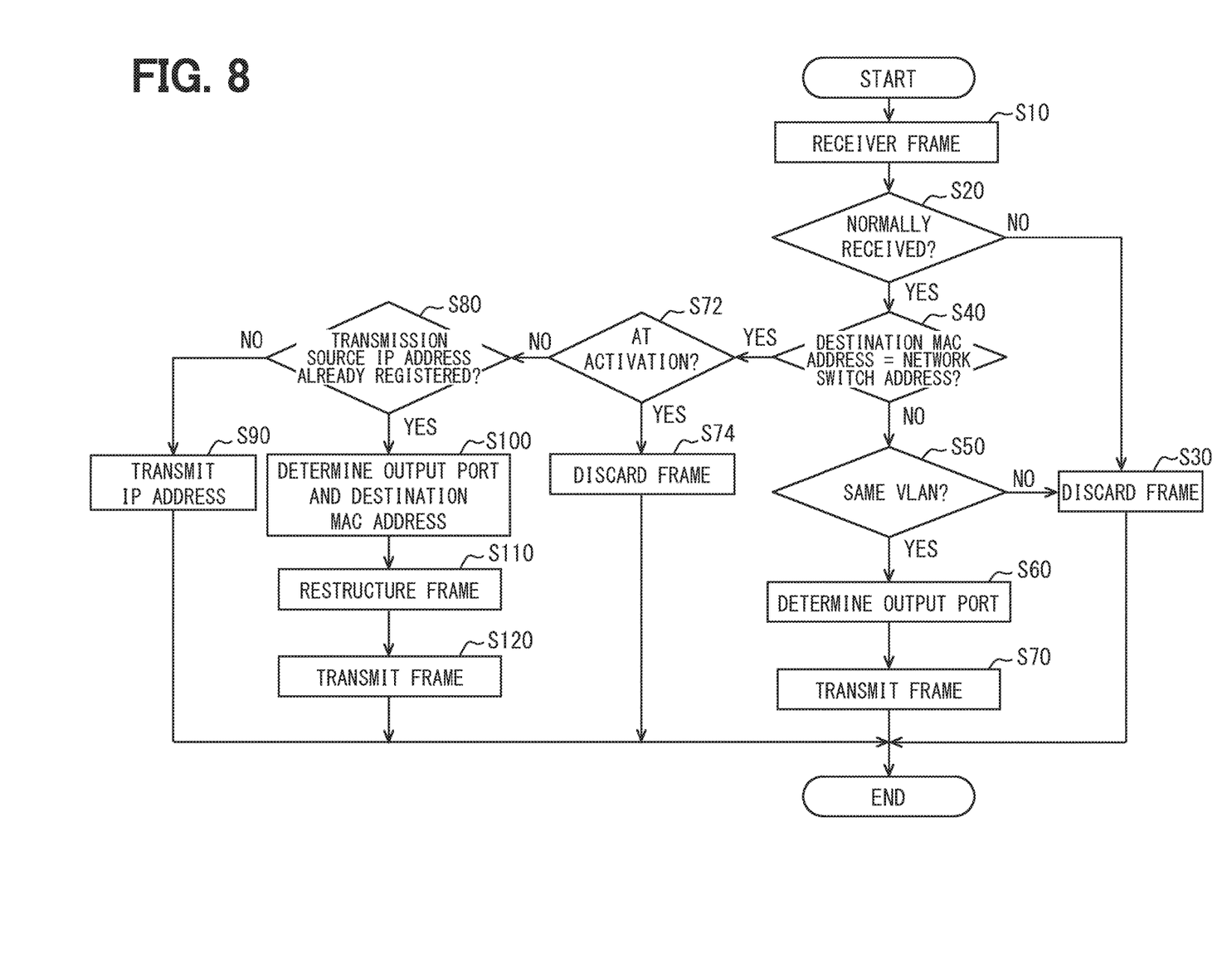
FIG. 8 is a flowchart showing a process performed by a switch IC in the network switch according to a second embodiment.

FIG. 8 shows a process that the IC switch 20 executes. In the present embodiment, the L3 receiver 26 is configured to execute the processes of steps S72 and S74.

When it is determined in step S40 that the destination MAC address is its own MAC address, the L3 receiver 26 determines whether the switch IC 20 is activated (at step S72). The activation time is a predetermined period after the switch IC 20 turns on by turning on the power source and the process starts.

When it is determined in step S72 as the activation time, the L3 receiver 26 discards the Ethernet frame (at step S74), and ends the series of process. Thereby, the L3 receiver 26 does not execute the process of step S80 at the time of activation.

When it is determined in step S72 that it is not the activation time, the L3 receiver 26 executes the process of step S80. The subsequent process is the same as in the preceding embodiment.

As described above, in the present embodiment, the L3 receiver 26 discards the Ethernet frame without determining the transmission source IP address at the time of activation. Since the IP routing operation stops at the activation time, the process load (that is, the amount of communication) at the activation time can be reduced. Since the communication amount and the heat generation amount of the circuit of the switch IC 20 are in a substantially proportional relationship, the heat generation can be reduced. By reducing the heat generation, the circuit scale of the switch IC 20 can also be reduced.

Further, in the present embodiment, at the time of activation, only the MAC address table in the MAC address table and the routing table may be written in the corresponding memory (i.e., the first memory 23). Since the communication can start even when the writing from the microcomputer 30 to the second memory 25 is not completed, the activation time of the network switch 10 can also be shortened.

Figure 9:
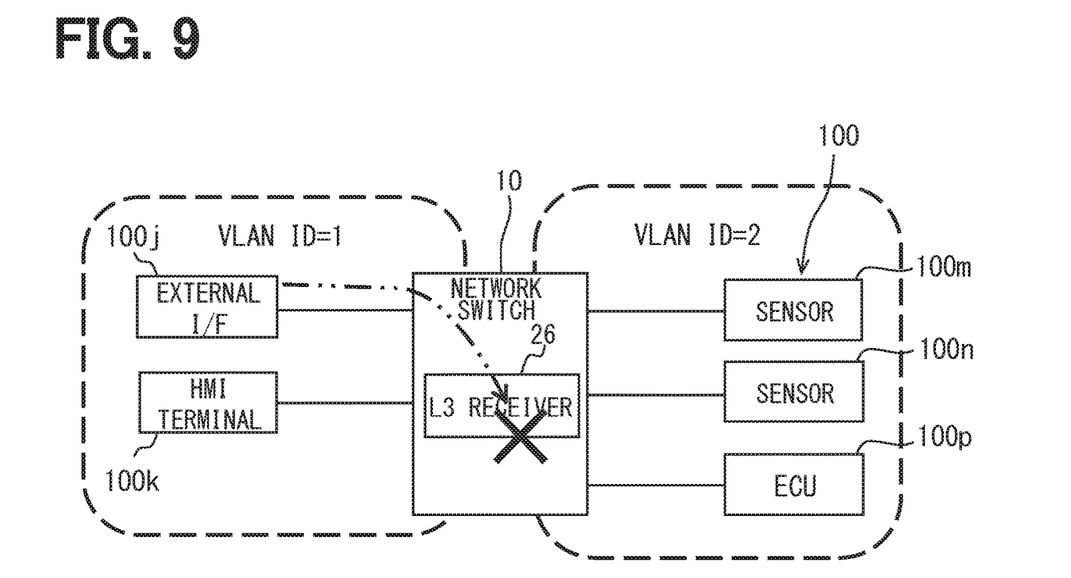
FIG. 9 is a diagram showing a transfer example of a Ethernet frame at activation.

FIG. 9 shows a specific example. In FIG. 9, the in-vehicle network is divided into two VLANs. The first VLAN (having the value of "VLAN ID=1") includes the external I/F 100j and the HMI terminal 100k as the nodes 100, and the second VLAN (having the value of "VLAN ID=2") includes the sensors 100m and 100n and the ECU 100p as the nodes 100. The ECU 100p is, for example, an engine ECU. The first VLAN is an infotainment system, and the second VLAN is a control system. The external I/F 100j corresponds to the external interface.

When the ECU 100p is reprogrammed, an Ethernet frame including reprogramming data is transferred from the external I/F 100j to the ECU 100p via the network switch 10. However, one system (i.e., structure) is closed within one VLAN. Therefore, at the activation time, as shown by the two-dot chain line in FIG. 9, the network switch 10 discards the Ethernet frame to be transferred from the external I/F 100j to the ECU 100p.

Thus, the network switch 10 discards the Ethernet frame transferred between the first VLAN including the external I/F 100j and the second VLAN at the time of activation. At the time of activation, since the IP routing operation of the Ethernet frame input from the external I/F 100j stops, the security at the activation time can be enhanced.

Third Embodiment

For the present embodiment, it may refer to the preceding embodiment. Therefore, the description of the parts common to the network switch 10 described in the preceding embodiment is omitted.

Figure 10:
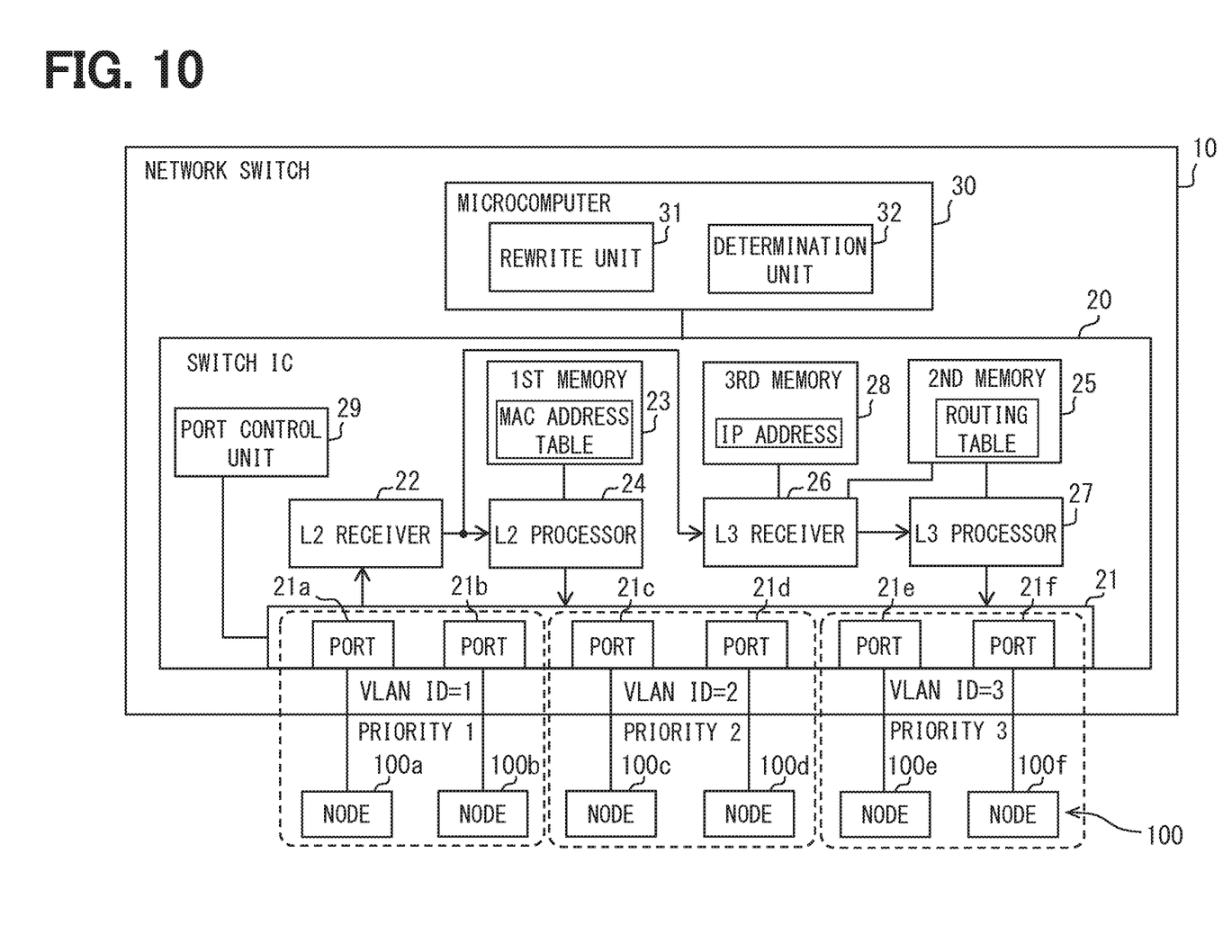
FIG. 10 is a diagram showing a network switch according to a third embodiment.

As shown in FIG. 10, in the present embodiment, the switch IC 20 has a port control unit 29. The port control unit 29 controls to turn on the power source of the port 21 in the order of priority set according to the VLAN at the time of activation. That is, the port control unit 29 controls the turn-on timing of the power source of the port 21 for each VLAN.

In FIG. 10, the network is divided into three VLANs. Among the ports 21, the ports 21a and 21b in which the value of "VLAN ID=1" is set have the priority of "1." The ports 21c and 21d in which the value of "VLAN ID=2" is set have the priority of "2", and the ports 21e and 21f in which the value of "VLAN ID=3" is set have the priority of "3." For example, a VLAN including the ports 21a and 21b is a control system, a VLAN including the ports 21c and 21d is a body system, and a VLAN including the ports 21e and 21f is an infotainment system. The body system is a system related to windows, mirrors, doors, wipers and the like.

Figure 11:
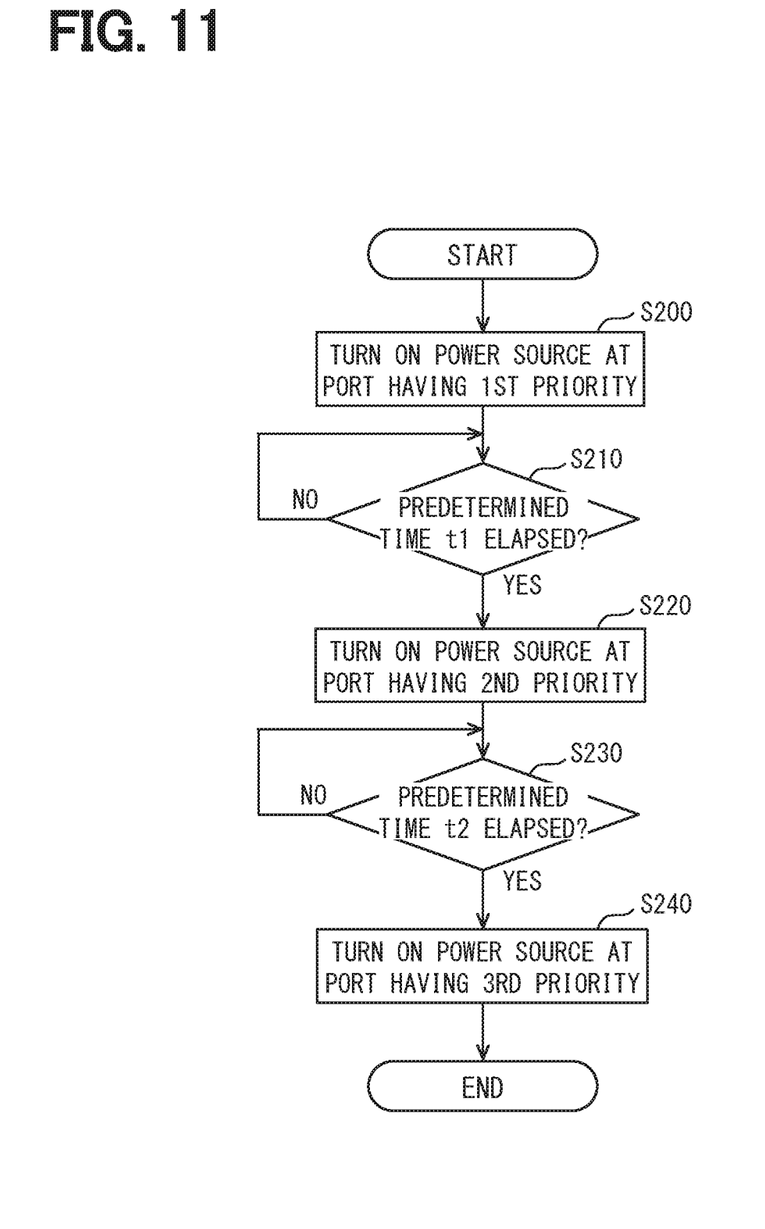
FIG. 11 is a flowchart showing a process executed by a port control unit of the switch IC.

FIG. 11 shows a process performed by the port control unit 29 in the switch IC 20. The port control unit 29 executes the following process when the switch IC 20 is activated.

At the activation time, the port control unit 29 first turns on the power source of the ports 21a and 21b having the first priority (at step S200). This enables transfer of Ethernet frames between the nodes 100a and 100b in the same VLAN.

Next, the port control unit 29 determines whether a predetermined time t1 has elapsed since the execution of step S200 (at step S210), and the power source of the ports 21c and 21d having the second priority turns on when the predetermined time t1 has elapsed (at step S220). As a result, the nodes 100c and 100d can also transfer Ethernet frames. For example, transfer of an Ethernet frame from the node 100a to the node 100d is executable.

Next, the port control unit 29 determines whether a predetermined time t2 has elapsed since the execution of step S220 (at step S230), and the power source of the ports 21e and 21f having the third priority turns on when the predetermined time t2 has elapsed (at step S240). Then, the series of process is completed. As a result, the nodes 100e and 100f can also transfer Ethernet frames. For example, transfer of an Ethernet frame from the node 100f to the node 100a is executable.

Figure 12:
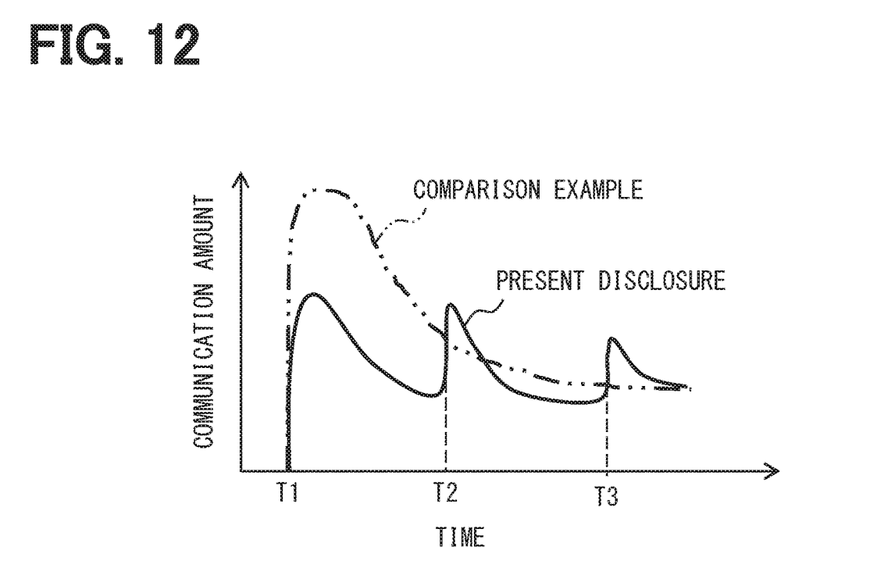
FIG. 12 is a diagram showing a change in the amount of communication at activation.

FIG. 12 shows a change in the amount of communication at the time of activation. The two-dot chain line indicates a comparative example in which the power sources of all ports 21 simultaneously turn on at the time of activation without the port control unit 29. The solid line shows an example (i.e., this example) of the present embodiment in which the port control unit 29 turns on the power source of the port 21 in the order of priority. In this embodiment, only the ports 21a and 21b are powered on at time T1 immediately after the activation, and the ports 21c and 21d are powered on at time T2 after a predetermined time t1 has elapsed from time T1.

Further, at time T3 after a predetermined time t2 has elapsed from time T2, the power source of the ports 21e and 21f turns on.

According to the present embodiment, the communication load is balanced since the power-on timing of the ports 21 is shifted according to the priority. For this reason, as shown in FIG. 12, the peak communication amount can be reduced compared to the comparative example. Since the heat generation amount is substantially proportional to the communication amount, the heat generation can be reduced by reducing the peak communication amount. Further, since the peak communication amount can be reduced, the circuit scale of the switch IC 20 can be reduced.

The disclosure of the present description is not restricted to the embodiments shown as examples. The disclosure encompasses the illustrated embodiments and variations based on the illustrated embodiments by those skilled in the art. For example, the disclosure is not limited to the combination of elements described in the embodiments. The disclosure may be implemented in various combinations. The disclosed technical scope is not limited to the description of the embodiments.

Although the example of port VLAN is described as VLAN, it is not limited to the port VLAN. It may be applicable also to tag VLAN and the like.

The switch IC 20 may be configured to execute at least the process of steps S10, S40, S50, S70, S80, S90, S100, S110, and S120. The process of step S90 is not limited to the IP address, and may be for information including the transmission source IP address.

The L3 processor 27 of the switch IC 20 may obtain the IP address of the next hop based on the routing table, obtain the MAC address from the IP address of the next hop by ARP (Address Resolution Protocol), and use it as the MAC address of the destination.

In the third embodiment, an example in which the port control unit 29 turns on the power source of the ports 21 in the order of the priority set according to the VLAN at the time of activation is described. On the other hand, in the example shown in FIG. 13, the priority is set to the port 21 regardless of the VLAN. Then, the port control unit 29 turns on the power source of the port 21 in the order of priority.

Figure 13:
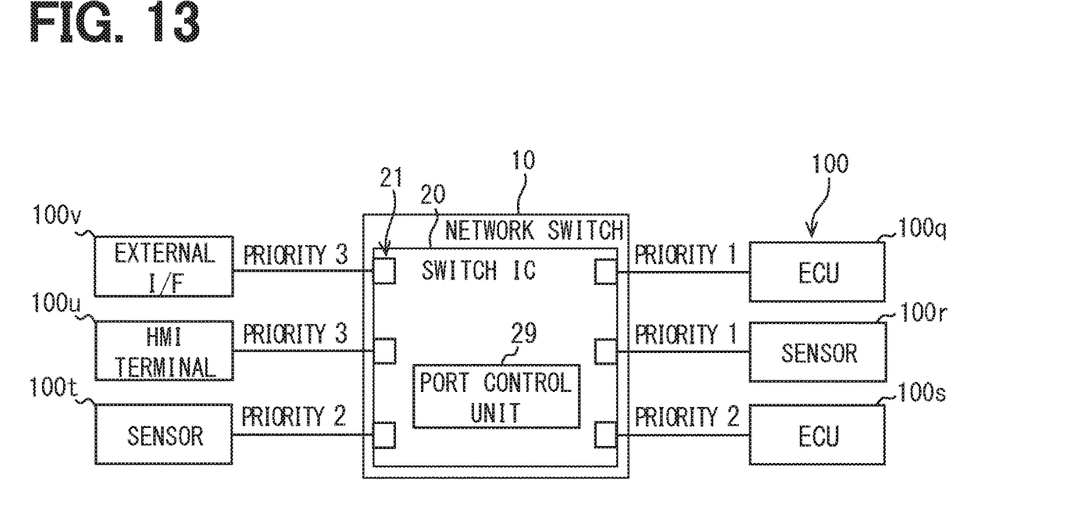
FIG. 13 is a diagram showing another example.

In FIG. 13, the in-vehicle network includes an ECU 100q, a sensor 100r, an ECU 100s, a sensor 100t, an HMI terminal 100u, and an external I/F 100v as the nodes 100 connected to the switch IC 20. Then, the port 21 to which the control system ECU 100q and the sensor 100r are respectively connected has the priority of "1", and the port 21 to which the body system ECU 100s and the sensor 100t are respectively connected has the priority of "2." Further, the port 21 to which the HMI terminal 100u and the external I/F 100v as the infotainment system are respectively connected has the priority of "3."

Then, the port control unit 29 of the switch IC 20 turns on the power source of the port 21 in the order of the priority of 1, 2 and 3 at the time of activation. According to this, the communication load is distributed since the power-on timing of the ports 21 is shifted according to the priority. For this reason, it is possible to reduce the peak communication volume and thus to reduce heat generation. Further, since the peak communication amount can be reduced, the circuit scale of the switch IC 20 can be reduced.

Here, the process of the flowchart or the flowchart described in this application includes a plurality of sections (or steps), and each section is expressed as, for example, S10. Further, each section may be divided into several subsections, while several sections may be combined into one section. Furthermore, each section thus configured may be referred to as a device, module, or means.

Although the present disclosure has been described in accordance with the examples, it is understood that the present disclosure is not limited to such examples or structures. The present disclosure encompasses various modifications and variations within the scope of equivalents. In addition, various combinations and forms, and further, other combinations and forms including only one element, or more or less than these elements are also within the scope and the scope of the present disclosure.

What is claimed is:

1. A network switch providing an in-vehicle network by connecting a plurality of ports and different VLANs, the network switch comprising:
   a switch IC having the plurality of ports; and a microcomputer,
   wherein: the switch IC includes:
   an L2 receiver that extracts a MAC address from a frame received through one of the ports, and determines whether a destination MAC address in the MAC address is an address of the network switch;
   a first memory that stores a MAC address table;
   a L2 processor that determines another one of the ports corresponding to the destination MAC address based on the MAC address table when the L2 receiver determines that the destination MAC address is not the address of the network switch, and transmits the frame through the another one of the ports;
   a second memory that stores a routing table;
   an L3 receiver that extracts an IP address of the frame when the L2 receiver determines that the destination MAC address is the address of the network switch, and determines whether a transmission source IP address in the IP address is a registered address which is registered in the routing table; and
   a L3 processor that determines an output port among the ports and another destination MAC address of a forwarding destination based on the routing table and a destination IP address in the IP address when the L3 receiver determines that the transmission source IP address in the IP address is the registered address, and transmits another frame, prepared by replacing the MAC address in the frame with the another destination MAC address of the forwarding destination, through the output port;
   wherein: the switch IC further includes a third memory that temporarily stores the IP address extracted by the L3 receiver; the L3 receiver transmits the IP address stored in the third memory to the microcomputer when the L3 receiver determines that the transmission source IP address in the IP address is not the registered address; and the determination unit of the microcomputer determines based on the IP address whether the transmission source node is the proper device.

2. The network switch according to claim 1, wherein: the microcomputer includes: a rewrite unit that rewrites a registered content of the MAC address table and a registered content of the routing table.

3. The network switch according to claim 1, wherein: the microcomputer includes: a determination unit that determines whether a transmission source node is a proper device allowed to perform a communication when the transmission source IP address in the IP address is not the registered address.

4. The network switch according to claim 1, wherein: the L2 processor sends the frame to the another one of the ports when a VLAN of a transmission source is equal to a VLAN of a destination; and the L2 processor discards the frame when the VLAN of the transmission source is not equal to the VLAN of the destination.

5. The network switch according to claim 1, wherein: the L3 receiver discards the frame at an activation time without determining whether the transmission source IP address is the registered address.

6. The network switch according to claim 5, wherein: the L3 receiver discards the frame, which is transferred between a first VLAN and a second VLAN, at the activation time; and the first VLAN includes an external interface as a node, and the second VLAN does not includes the external interface.

7. The network switch according to claim 1, wherein: the switch IC further includes a port controller that energizes the ports in order of priority set according to VLAN at an activation time.

\* \* \* \* \*